United States Patent [19]
Hughes

[11] 3,932,983
[45] Jan. 20, 1976

[54] TAMPER AND CONFINER FOR PRODUCT BUCKET

[75] Inventor: Charles C. Hughes, Ludlow, Ky.

[73] Assignee: R. A. Jones & Co. Inc., Covington, Ky.

[22] Filed: Sept. 26, 1974

[21] Appl. No.: 509,416

[52] U.S. Cl. ............... 53/252; 53/124 A; 53/124 D
[51] Int. Cl.² ...................... B65B 5/04; B65B 63/02
[58] Field of Search ...... 53/124 A, 124 D, 252, 258

[56] References Cited
UNITED STATES PATENTS
2,180,349  11/1939  DeBack .......................... 53/252 X
3,269,091  8/1966   Martin ............................. 53/252

Primary Examiner—Travis S. McGehee
Attorney, Agent, or Firm—Wood, Herron & Evans

[57] ABSTRACT

In a cartoning machine, a series of L-shaped product buckets mounted on a chain conveyor and a series of inverted L-shaped tamper-confiner elements mounted on a conveyor chain overlying the product buckets, the tamper-confiner elements being cammed to form, with the product buckets, a gradually closing, generally rectangular compartment whose inside dimensions are substantially the same as the carton into which the product is to be inserted. The structure permits the gradual shaping of a pouch to the size necessary for insertion into a carton.

7 Claims, 2 Drawing Figures

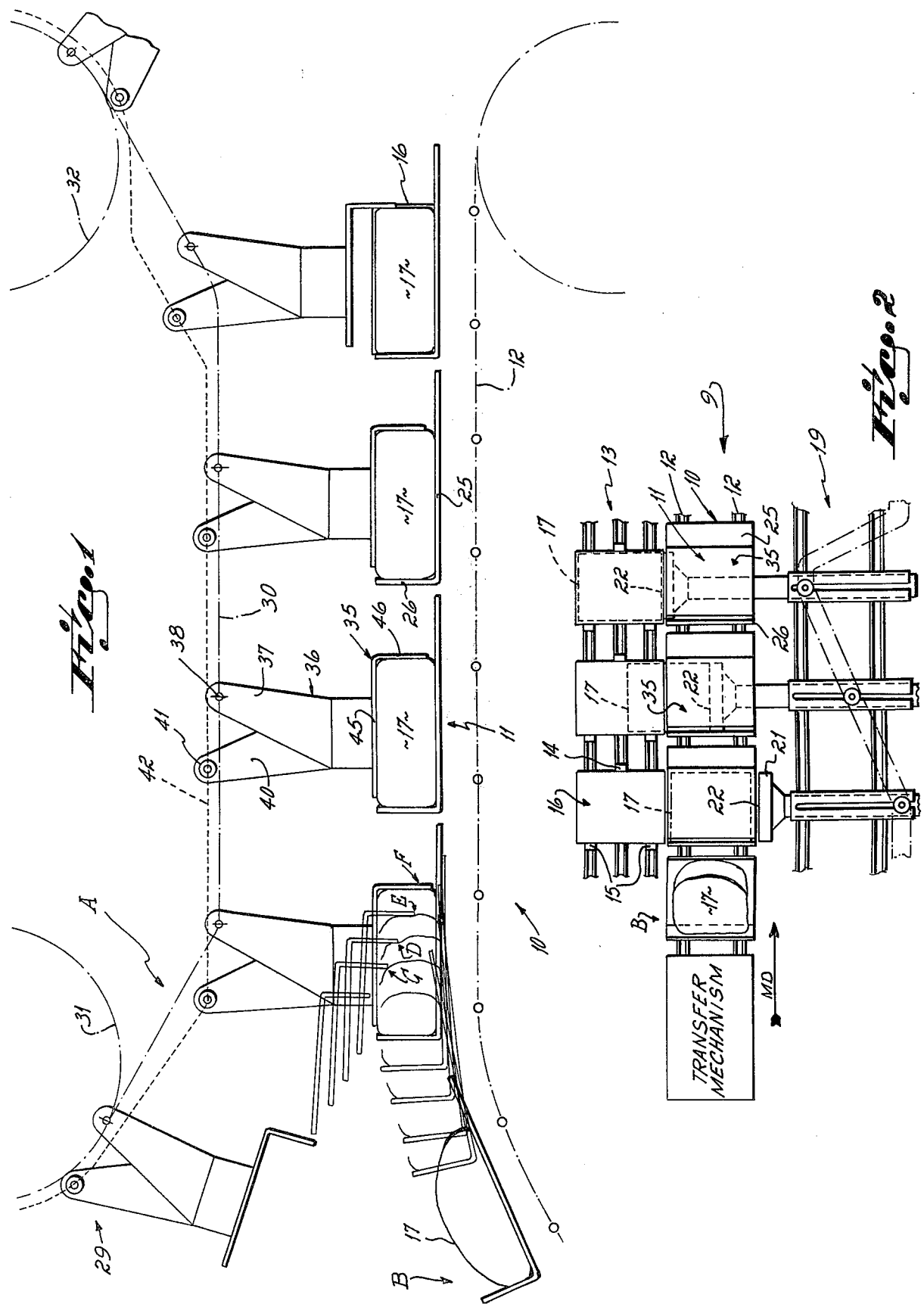

TAMPER AND CONFINER FOR PRODUCT BUCKET

This invention relates to cartoning apparatus, and more particularly, the invention is directed to a combination of product bucket and a tamper and confiner which together shape a product for insertion into a carton.

In continuous motion cartoners, it is common practice to convey an erected tubular carton in a horizontal attitude along a carton conveyor which includes spaced transport lugs mounted on chains, the cartons being confined between the transport lugs. Running parallel with the carton conveyor is a product bucket conveyor carrying a series of buckets, each of which is normally U-shaped. A barrel loader, which includes pusher elements carried by an endless chain, gradually thrusts a product from each bucket into a carton running parallel with the product bucket.

In such apparatus, the cartoning of a flexible pouch containing a particulate product has given rise to problems. In order to avoid an accusation of deceptive packaging, it is important that the pouch be fitted as snugly as possible into the carton.

In practice, the U-shaped product bucket has been made wide compared to the product in order to facilitate the transfer of the product into the product bucket. The edge of the product bucket has had its side walls adjacent the carton conveyor tapered inwardly so as to funnel the product into the carton as the pusher element of the barrel loader thrusts it from the product bucket into the carton. The funnel opening must be approximately the same dimension as the carton, and the pusher element must be approximately that dimension in order to push the product past the funnel opening into the carton.

When the flexible pouch is flopped onto the product bucket, it will not assume the precise position and configuration to be driven from the product bucket through the funnel opening into the carton. When there is a bad misalignment, the pouch tends to jam as it goes into the carton. Further, there is a resistance to the positioning of the pusher element created in part by the engagement of the top surface of the pouch by a flat tamper element which presses on the pouch to give it the proper vertical dimension or thickness. That resistance to the pusher element tends to cause the pouch to wrap around the pusher element so that in some instances, after the pouch has been thrust into the carton, the withdrawal of the pusher element will withdraw with it the pouch from the carton.

It has been an objective of the invention to provide a mechanism for shaping the pouch to the proper dimension for insertion into a carton before it is engaged by a pusher element.

To this end, the invention provides an L-shaped product bucket which is similar to the conventional U-shaped product bucket but has the leading wall removed. The bottom wall of the product bucket may be substantially the full pitch of the machine. The invention further provides an inverted L-shaped tamper-confiner which is carried above the product bucket on an endless chain and is cammed to move gradually into position with respect to the product bucket so as to gradually form with the product bucket a tubular opening of the same dimension as the carton. In gradually moving into this relationship, the tamper-confiner engages and shapes the pouch into a generally rectangular cross-sectional configuration approximating the configuration of the carton into which it is to be inserted.

The tamper-confiner is pivotally supported on the endless chain and has a bracket riding in a cam track. The cam track configuration may be designed to impart any desired movement to the tamper-confiner within limits.

The several features of the invention will become more readily apparent from the following detailed description taken in conjunction with the accompanying drawings in which:

FIG. 1 is a diagrammatic side elevational view of the invention; and

FIG. 2 is a diagrammatic top plan view of the invention and associated cartoner elements with which it cooperates.

The cartoner employing product buckets conveyed parallel to a carton conveyor and a barrel loader for thrusting a product from the product buckets into cartons is conventional and will not be illustrated in detail here.

Referring to FIG. 2, a cartoner 9 includes a product bucket conveyor 10 comprising product buckets 11 supported on endless chains 12. A carton conveyor 13 has a leading transport lug 14 and trailing transport lugs 15 which confine between them the cartons 16 into which a product is to be loaded.

The product, which in this instance consists of a flexible pouch 17, is discharged one at a time into a respective product bucket 11. The product is conveyed in the product bucket past a barrel loader 19 having a plurality of conventional pusher elements 21. The end faces 22 of the pusher elements 21 are of the same rectangular dimension as the inside of the carton. The pusher elements are endlessly driven and cammed to move gradually through a product bucket 11 to drive the product in the bucket from the bucket into the adjacent carton 16.

Referring to FIG. 1, each product bucket 11 is L-shaped and has a horizontal bottom wall 25 whose length may be up to the pitch of the machine, the pitch being the distance between centers of adjacent buckets or cartons. The product bucket 11 also has a trailing vertical wall 26. A series of product buckets 11 is mounted on one or more endless chains 12 in spaced relation, as illustrated.

Overlying the product bucket conveyor 10 is a tamper-confiner 29. The tamper-confiner 29 includes an endless chain 30 passing around sprockets 31 and 32. A series of L-shaped tamper-confiner elements 35 are fixed on brackets 36. Each bracket 36 has a chain arm 37 by which it is connected to the chain 30 about a pivot axis 38. The bracket 36 also includes a cam arm 40 carrying a roller 41 which rides in an endless cam track 42. The configuration of the cam track determines, to some extent, the path of movement which each tamper-confiner element 35 takes.

The tamper-confiner element 35 is of an inverted L-shape having a horizontal top wall 45 and a vertical leading wall 46. During that portion of the movement of the product bucket 11 when the barrel loader pusher element 21 is transferring the pouch into the carton, the juxtaposition of the tamper-confiner element 35 to the product bucket 11 is such as to create a rectangular tube whose inside dimensions are substantially the same as the inside dimensions of the carton.

It may, in some instances, be desirable to program the motion of the tamper-confiner element 35 so that it closes down on the pouch to a greater extent than illustrated in FIG. 1 and then backs off to the dimension of the carton just before the barrel loader pusher element 21 engages the pouch. That motion can be provided simply by altering the configuration of the cam track in the area indicated at A in FIG. 1.

In the operation of the invention, the transfer mechanism discharges a pouch 17 onto a product bucket 11 as the product bucket is moving upwardly toward the linear portion of the conveyor, as at B. The pouch will slide to the trailing corner of the product bucket. When flopped onto the product bucket, the pouch has an irregular configuration whose longitudinal dimension is normally greater than the longitudinal dimension of the carton.

As the product bucket 11 and the tamper-confiner element 35 move together, the vertical wall 46 of the tamper-confiner element moves into engagement with the leading edge of the pouch and gradually forces the pouch toward the vertical trailing wall 26 of the product bucket 11 through the positions indicated by broken lines at C, D and E. When the tamper-confiner element 35 reaches its final position, as indicated at F, the pouch has been reshaped by the cooperative action of the product bucket and tamper-confiner element into a generally rectangular configuration whose dimensions are substantially the same as the inside dimensions of the carton into which it is inserted.

At approximately the F position, the pusher element 21 of the barrel loader 19 moves into engagement with the pouch and begins to thrust it into the carton 16. Since the pouch and the rectangular opening created between the bucket 11 and tamper-confiner element 35 are the same dimensions and configuration as the pusher element 21, there is no chance for the pouch to become jammed or to wrap around the pusher element 21 and become withdrawn from the carton after it has been introduced into it.

Following the introduction of the product, the element 35 is carried by chain 30 up and away from the product bucket.

I claim:

1. In cartoning apparatus, a pouch shaping mechanism comprising,
   an L-shaped product bucket having a horizontal and a trailing vertical wall,
   an endless chain supporting said product bucket,
   a tamper-confiner overlying said product bucket,
   an inverted L-shaped tamper-confiner element carried by said tamper-confiner, said tamper-confiner element including a horizontal wall and a vertical leading wall,
   means for moving said tamper-confiner element gradually into juxtaposition with respect to said product bucket to confine a pouch carried in said product bucket to a desired dimension.

2. In a continuous motion cartoner comprising,
   an endless carton transport conveyor,
   a product bucket conveyor extending parallel to said transport conveyor and containing a series of product buckets,
   means for feeding pouches into said buckets,
   a barrel loader located adjacent said bucket conveyor to thrust said pouches from said buckets into cartons,
   the improvement comprising,
   said buckets being L-shaped and having a horizontal bottom wall and a vertical trailing wall,
   an endless chain overlying said bucket conveyor,
   a series of inverted L-shaped tamper-confiner elements mounted on said chain, each having a horizontal top wall and a vertical leading wall,
   and means for bringing each said bucket gradually into juxtaposition with a respective tamper-confiner element to define a generally rectangular tube confining a pouch.

3. Apparatus as in claim 2 in which said last named means causes said leading wall of said tamper-confiner element to engage the leading surface of a pouch and gradually force it rearwardly while said top wall confines the top surface of said pouch.

4. Apparatus as in claim 2 in which said barrel loader includes a plurality of pusher elements each having a pouch engaging surface of the same dimensions and configuration as the inside of said rectangular tube.

5. Apparatus as in claim 2 in which each said bottom wall has a longitudinal dimension approximately equal to the pitch of the cartoner.

6. Apparatus as in claim 2 in which said last named means includes,
   a bracket fixed to each said tamper-confiner element,
   said bracket having a first arm pivoted to said endless chain,
   said bracket having a second arm, a cam roller on said arm,
   and a cam track receiving said roller to define the motion of said tamper-confiner element.

7. Apparatus as in claim 2 in which said last named means includes,
   a cam track,
   and a follower secured to said tamper-confiner element,
   said follower cooperating with said cam track to define the path of movement of said tamper-confiner element.

* * * * *